*(12)* United States Patent
McCollough, Jr.

(10) Patent No.: US 7,369,056 B2
(45) Date of Patent: May 6, 2008

(54) PHOTOELECTRIC CONTROLLER FOR ELECTRIC STREET LIGHTING

(75) Inventor: Norman D. McCollough, Jr., Sharon, NH (US)

(73) Assignee: Hendrix Wire & Cable, Inc., Milford, NH (US)

( * ) Notice: Subject to any disclaimer, the term of this patent is extended or adjusted under 35 U.S.C. 154(b) by 227 days.

(21) Appl. No.: 11/274,993

(22) Filed: Nov. 16, 2005

(65) Prior Publication Data

US 2007/0109142 A1  May 17, 2007

(51) Int. Cl.
*G08B 21/00* (2006.01)
(52) U.S. Cl. ............... 340/635; 340/641; 340/931
(58) Field of Classification Search ........ 340/635, 340/907, 916, 931, 10.1, 10.3, 641, 539.1, 340/538.15; 315/129, 132, 133
See application file for complete search history.

(56) References Cited

U.S. PATENT DOCUMENTS

| | | | | |
|---|---|---|---|---|
| 3,098,971 A | * | 7/1963 | Richardson | 455/19 |
| 5,479,159 A | * | 12/1995 | Kelly et al. | 340/10.1 |
| 6,791,284 B1 | * | 9/2004 | Levy | 315/292 |
| 7,030,777 B1 | * | 4/2006 | Nelson et al. | 340/933 |
| 7,050,808 B2 | * | 5/2006 | Janusz et al. | 455/445 |
| 7,123,140 B1 | * | 10/2006 | Denes | 340/539.1 |

* cited by examiner

*Primary Examiner*—Toan N. Pham
(74) *Attorney, Agent, or Firm*—DLA Piper US LLP; R. Blake Johnston

(57) ABSTRACT

An electric street light controller apparatus and monitoring method allows automatic street light turn-on and turn-off characteristics to be field programmable using RFID technology, lamp current magnitude recording, auxiliary sensor input, diagnostic alarming and data storage for later retrieval in a remote electric street lighting monitoring system. The apparatus and method includes, from a remotely located exciter apparatus using an antenna to transmit a specific frequency and code key to the antenna of an electric street light control and monitoring apparatus associated with the electric street light allowing remote wireless field programming of turn-on light levels, turn-off light levels, rate of change of light levels, specific turn-on, turn-off, and turn back on sequences during dark hours, and specific remote wireless sensors or internal sensor inputs useful for radiological, biological, chemical, or environmental sensing and alarming. Additionally the method and apparatus includes a method of providing automatic diagnostics for the street lamp bulb, starter and self diagnostics of the controller itself.

22 Claims, 4 Drawing Sheets

PHOTOELECTRIC CONTROLLER FOR ELECTRIC STREET LIGHTING

BACKGROUND OF THE INVENTION

1. Field of Invention

This invention finds use in the field of electric street lighting. In particular, this invention relates to the application of RFID or similar wireless technology to operate, monitor operating characteristics and/or capture historical parametric data for one or more electric streetlights

2. Background

Electric street lights are of a general high priority due to road safety and security issues along public streets, certain areas of high security, or any area where homeland safety and security issues arise. Previously, streetlight controllers have historically only turned the street lights on or off with a given preset light level or off after a delayed time usually 4 hours after dark.

A further problem in the current technology street light controllers is that a pulsating light source, i.e., a laser pointer, can fool the street light control and turn the street light off. This is of particular interest to those areas of high security in which the lighting conditions are of paramount importance.

Existing street light controllers also have no self-diagnostic capability in that they can not monitor lamp current to determine if a light is cycling off and on (a particular failure mode of the lamp), if the bulb is on during the daylight hours (a different typical control failure mode), or if the bulb has failed and will not turn on during the normal dark times.

Further, existing street light controls cannot be used for any type of remote sensing of the conditions of radiological, biological, chemical or environmental conditions useful in an alerting system for homeland security.

Finally, current technology street light controllers cannot wirelessly communicate with ground personnel proximate to the street light, or communicate in a peer—to peer fashion to a central data collection point.

SUMMARY OF INVENTION

The present invention is directed to an improved street lighting control and monitoring system that will hold the magnitude of the bulb current that flowed during the failed condition of the street light, provide specific alarms for anti-terror purposes, provide communications either proximate to the street light or peer to peer to a central data collector via RFID technology, allow remote on/off overrides using remote wireless RFID transmitters, permit field programmable turn-on and turn-off characteristics as well as delay off after dark then predictive on before dawn, and visible LED alarm conditions.

BRIEF DESCRIPTION OF THE DRAWINGS

Specific embodiments of the invention have been chosen for purposes of illustration and description, and are shown in the accompanying drawing, forming a part of the specification wherein:

FIG. 3 is a block diagram of the street light controller and monitor; and.

DESCRIPTION OF PREFERRED EMBODIMENTS

Figure 1:
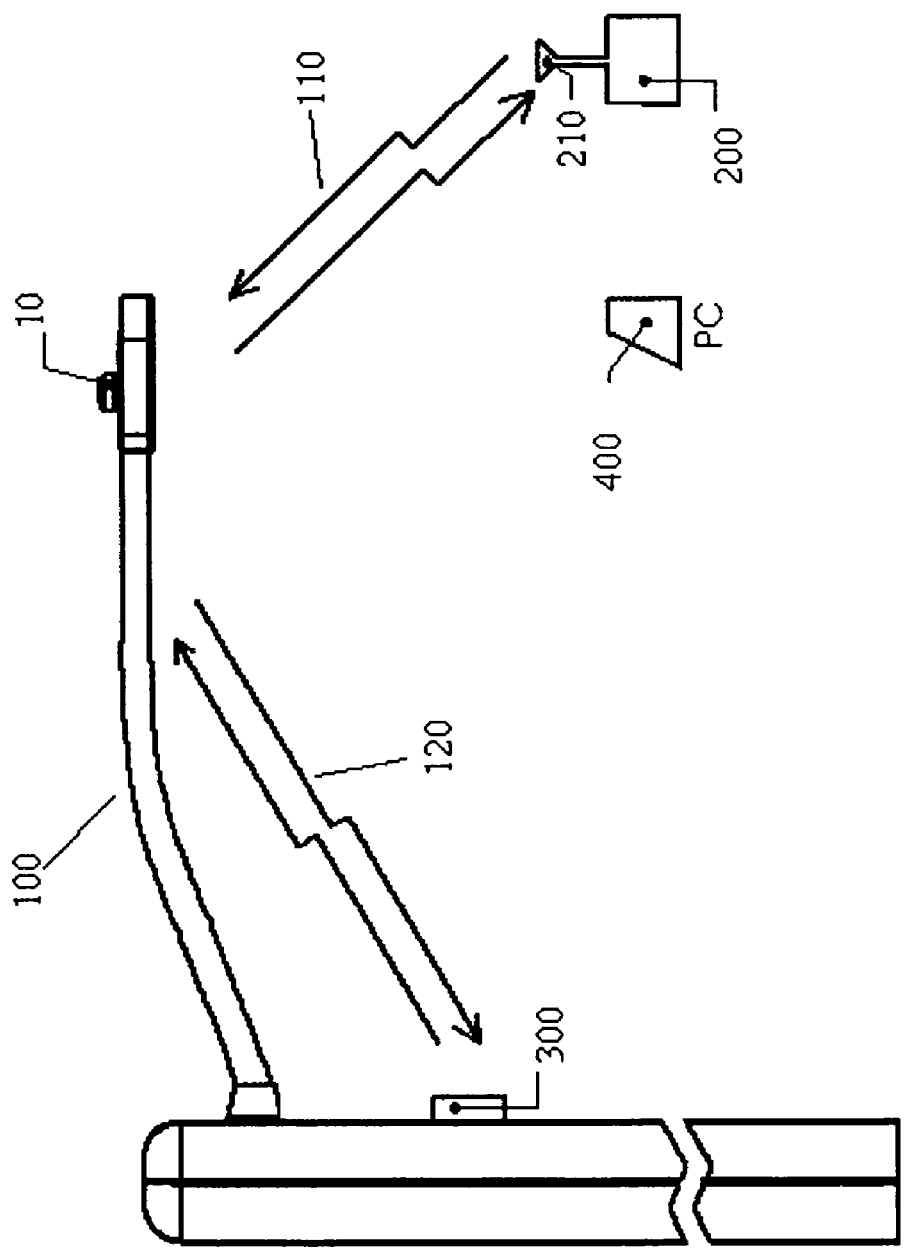
FIG. 1. is schematic diagram of the remote street light controller and monitoring system of the instant invention.
Figure 2:
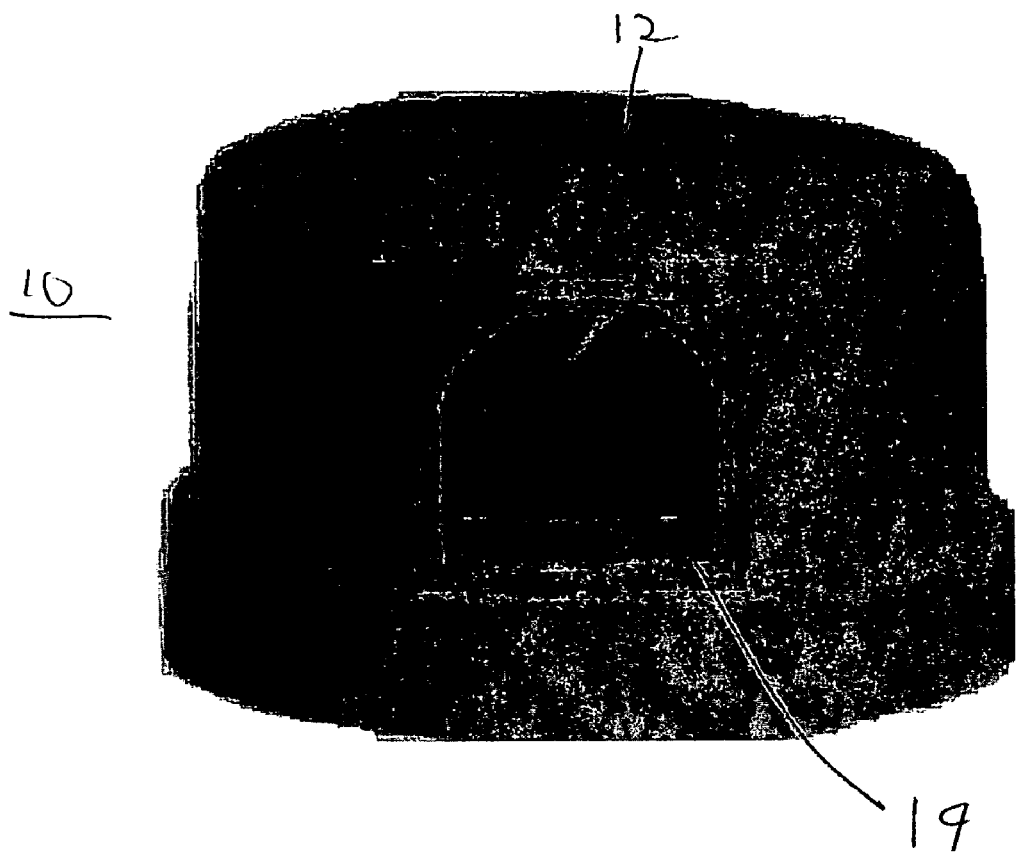
FIG. 2 is a perspective view of the exterior portion of the remote street light controller and monitoring system of the instant invention.

Referring now to the drawings, FIG. 1 illustrates the Street Light Controller and Monitor (SLCM) 10 of the instant invention mounted in a typical position on top of a representative street light 100. As is shown in FIG. 2, the exterior portion of the SLCM is comprised of a covering or shell 12 having an transparent or translucent window portion 14.

Programming of the SLCM 10 is accomplished through radio frequency transmissions 110 are sent from the antenna 210 of the exciter 200. Contained in these transmissions is a code key for the individual SLCM. Anti-collision protocols are implemented in the street light controller and monitor 10 such that only the street light controller monitor having a matching code key will respond to the exciter 200 signal. FIG. 1 further shows the exciter unit 200 collecting data from the individual SLCM 10 by way of radio frequency transmissions 110. The exciter system 200 further includes an I/O section for transferring the stored data to a host portable computer 220. The exciter 200 is configured to be portable and operate proximate to an SLCM 10.

Additionally, radio frequency transmissions 120 from a remote wireless satellite sensor device (RSSD) 300 are received by the SLCM 10 for data collection. If the RSSD 300 detects an abnormal condition of radiological, biological, chemical, or environmental conditions, a radio frequency transmission 120 to the SLCM 10 is initiated. In response, the SLCM 10 flashes an internal LED 30 (discussed below) and sends a radio frequency transmission to surrounding SLCM units 10. In this manner a peer-to-peer communications alarm condition is signaled to all surrounding SLCM units. The signals are further sent to a central collection point.

Figure 3:
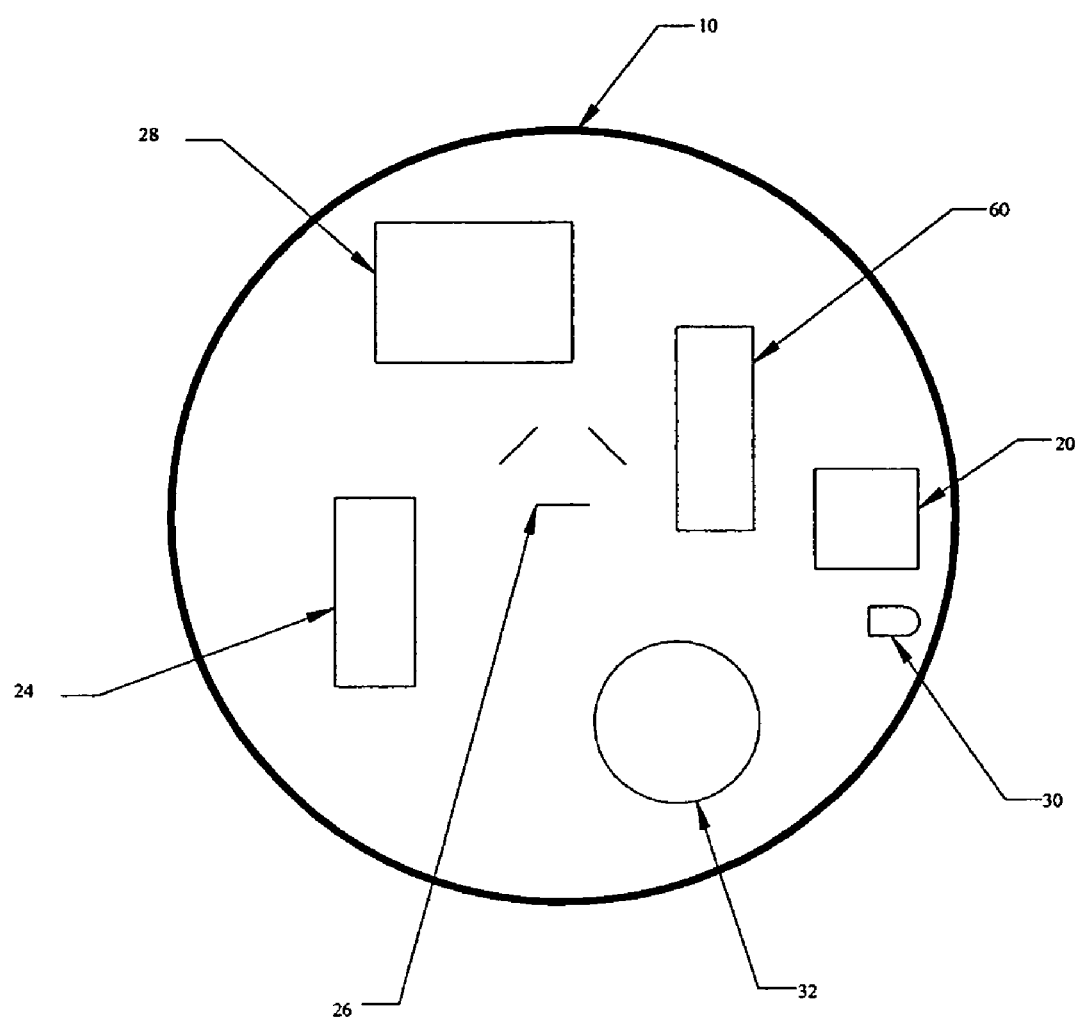

Referring now to FIG. 3, operation of the street light controller and monitor unit is accomplished as follows: specific frequency band of sunlight levels sensed by photosensor 20 in window area 14 (See FIG. 2) of the SLCM 10 are converted to electrical levels corresponding to foot-candles of illumination. Printed wire connection from the photo-sensor 20 to a microprocessor control unit (MCU) 60 conveys the electrical representation of light level. The light level is stored in RAM 72 (see FIG. 4). Load Control Relay (LCR) 24 is controlled by electrical signal from the MCU 60. Load Control Relay (LCR) 24 contacts supply AC power to the twist lock contact plug 26 to allow application of power to the street lamp 10 to illuminate it. AC voltage and current from the twist lock contact plug 26 supply incoming power to power supply 28. Power supply 28 converts AC power to DC power for the DC circuitry of the SLCM 10. If an abnormal operational condition or specific alarm is sensed by MCU 60, then LED 30 enunciates error conditions. MCU 60 also monitors further, specific radiological, biological, chemical, or environmental ("RBCE") conditions sensed by RBCE sensor 32. These alarms are also enunciated by LED 26 and are transmitted in a peer-to-peer fashion by MCU 2 to other street light control monitors or to a central data collector. RBCE 5 sensor can also be remotely located from the actual SLCM 10 unit as a satellite device proximate to the SLCM 10 and wirelessly convey alarm conditions to the SLCM 10 unit. The RBCE 32 sensor located remotely from the Street Light Controller and Monitor utilizes active tag RFID technology to act as a transponder to periodic transmission of radio frequencies from the Street Light Controller and Monitor 10

Figure 4:
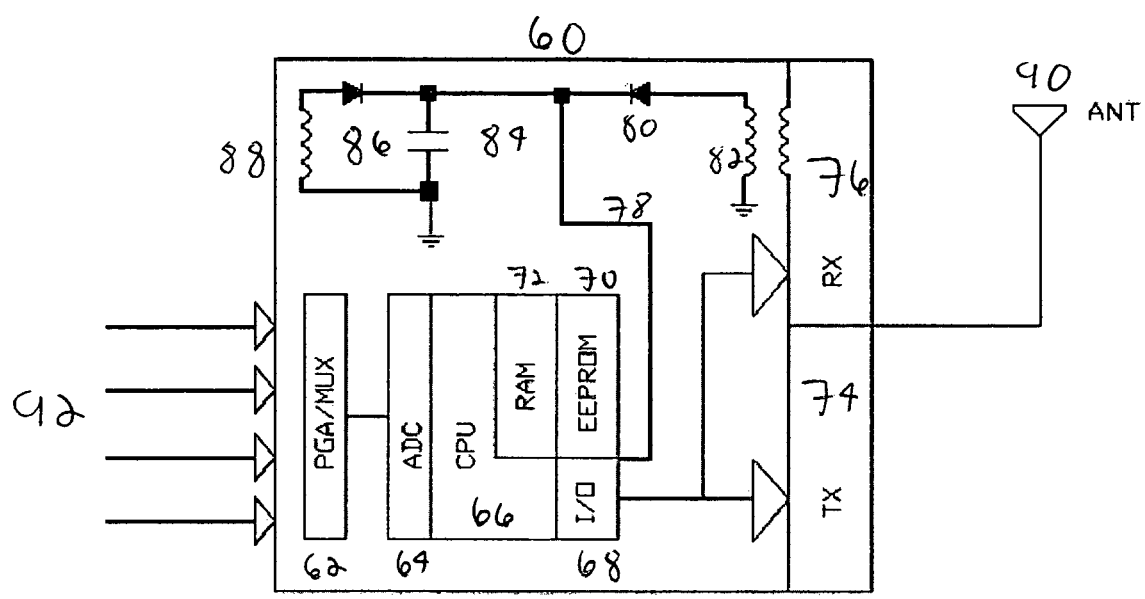
FIG. 4 is a block diagram of the street light MCU unit.

Now, referring to FIG. 4, The analog-to-digital converter (ADC) 11 internal to the MCU 60 converts the electrical signals to a digital representation of the foot-candle magnitude. Internal data stored in EEPROM (electronically alterable read-only memory) 70 are compared to the digital light level stored in RAM 72. If light levels stored in RAM memory 72 are decreasing, and have dropped below a programmable preset turn-on level in EEPROM 70 for the turn-on, the controller will turn the load control relay (LCR) 24 on and cause the street light to illuminate. Consequently; if light levels stored in RAM memory 72 are increasing, and have risen above a programmable preset turn-on level in EEPROM 70 for the turn-off, the controller will turn the load control relay (LCR) 24 off and cause the street light to extinguish. Light levels may be of an inverse ratio i.e., 1.5 foot candles off and 1.0 foot candles on. Full wireless programming of the turn-on and turn-off light levels is accomplished via the exciter 200 proximate to the street light controlled and monitor. If current levels fluctuate at some few cycles per second, the MCU 60 will determine that a "cycling bulb" problem exists with the street light and illuminate an LED 30 to indicate a warning.

Still referring to FIG. 4 as well as FIG. 3, the unit power is supplied from the nominal line power supplied to the street light from the electric utility power through a twist lock connector 26, the rectified AC voltage is stored on super capacitor in power supply 28 or if no power is available, once the street light controller monitor 10 has received RF energy from the exciter 200 for some small interval of time, the unit will power up using the rectified RF energy passed through rectifier 19 and stored in a super capacitor 84 for operating power.

Again referring to FIG. 4, if the code key transmitted from the exciter 200 matches the code key stored in the MCU 60 EEPROM 70 of the street light controller and monitor unit, the street light controller and monitor 10 will respond by radio frequency transmissions of data stored in EEPROM 70. If the code key transmitted by the exciter 200 does not match the internal code key stored in the street light controller and monitor EEPROM 70, the street light controller and monitor 10 will go into a power saving sleep mode of operation.

Referring both to FIG. 1 and FIG. 4, the exciter 200 unit has a transmitting and receiving antenna 210 to transmit the RF energy of a specific frequency to the remotely located street light controller and monitor 10 through antenna 90. When the exciter unit 200 is brought in proximity to the street light controller and monitor 10, the operator initiates a signal transmission from the exciter 200. If the code keys match, data collected by the street light controller and monitor will be directed to the MCU 60 for transmission by a particular modulation scheme by RF transmitter 74 and antenna 90. Design of the particular RF modulation scheme capable of encoding the data collected in the street light controller and monitor unit is well within the skill level of those ordinarily skilled in the art. Once the data have been received at antenna 210 and demodulated by receiver and controller in the exciter 200, the data are stored in the exciter memory. The data will be stored until downloaded to a host portable computer 400. A rechargeable battery internal to the exciter will power the exciter. The active specific frequency embodiment uses technology similar to that used in radio frequency identification (RFID) tags that use the rectified radiated RF energy as an additional internal power source of the street light controller monitor device.

Location, pole number, GPS data or any number of enumeration and identification schemes used by the electric utility may be entered either electronically or manually into the host computer 400 for later use in determining the path alarm information conveyed from the street light controller monitor 10. This path information is also useful in determining path information of RBCE 32 sensor data for homeland security.

In summary, the disclosed photo-control system provides at least the following advantages over the prior art:

An adaptive daylight following method to permit a programmable turn on before dark or before daylight a safety feature especially useful in highway street lighting applications and school bus pickup areas.

An ability to turn off a programmable time after dark to provide an energy conservation feature.

An ability to resist artificial light level turn off that is useful in maintaining perimeter lighting in high security areas or critical areas for vandalism or terrorist attack.

A capability to monitor ambient levels to allow low road use times to turn off lights for long periods of no road use and to "hot start" the street light based on an increasing rate of ambient light change by an oncoming vehicle.

A self-diagnostic capability to minimize down time. The diagnostic ability features a flashing red light during daylight hours as an alert of problems. Wireless commands from a ground remote reader/transmitter can retrieve failure information and history The ability to field program the turn on levels (lux), turn off levels, and various delay times over a wireless RF link.

A method to have multiple controls gang together via a wireless command to turn on simultaneously. This is useful in a parking lot application where all lights should turn on and off together.

In addition to the structures, sequences, and uses immediately described above, it will be apparent to those skilled in the art that other modifications and variations can be made the method of the instant invention without diverging from the scope, spirit, or teaching of the invention. Therefore, it is the intention of the inventor that the description of instant invention should be considered illustrative and the invention is to be limited only as specified in the claims and equivalents thereto.

I claim:

1. A method for determining a failure in a street light having a street light controller monitoring apparatus having a particular information signature, recording the data, and storing the data for retrieval, the method comprising:
   a) applying a specific frequency activation signal and a code key from an exciter positioned proximate to the street light controller monitoring apparatus;
   b) detecting a data signal at the exciter from the street light controller monitor, said data signal produced by modulating a specific frequency in response to a measured current parameter;
   c) receiving at the exciter the street light controller data from the data signal;
   d) associating the street light controller current magnitude with the information signature for said street light controller monitor unit; and
   e) storing the data and phase conductor information in the memory of the exciter for downloading to a host computer.

2. The method of claim 1 wherein the step of applying a activation signal further comprises applying a modulated signal having a specific frequency chosen to resonate with an RF detection circuit of the street light controller monitor.

3. The method of claim 1 wherein the street light controller monitor has fault current response time further including the step where said current response time is slowed to allow for "inrush" conditions on the power line.

4. The method of claim 1 wherein the step of applying a activation signal further comprises positioning the exciter apparatus near the street light controller monitor to actuate the street light controller monitor with the specific frequency signal.

5. The method of claim 1 wherein the street light controller monitor apparatus responds to only a match with the exciter transmitted code key.

6. The method of claim 1 wherein the step of detecting a data signal from the street light controller monitor further comprises detecting street light controller current magnitude information from the street light controller monitor data signal.

7. The method of claim 6 wherein the step of detecting the data signal from the street light controller monitor further comprises detecting an impedance modulation of a radiated RF field of the exciter; and decoding the data as the impedance modulation by operation of the street light controller monitor.

8. The method of claim 1 wherein the step of downloading the street light controller monitor data further comprises communicating data over a hard wire link, a wireless link, or a network.

9. The method of claim 8 wherein the step of communicating data further comprises establishing a temporary connection between the exciter and the host computer conveying the data from the exciter to the host computer over the temporary connection and breaking the temporary connection.

10. An integrated remote monitoring system for monitoring en an electric street light, the monitoring system comprising:
    a) a microcontroller unit;
    b) an antenna coupled to the microcontroller unit;
    c) receiving means connected to the microcontroller unit;
    d) transmitting means connected to the microcontroller unit;
    e) at least one sensor input connected to at least one external sensor;
    f) a super capacitor for electrically powering the integrated monitoring system during a loss of power to said streetlight , said super capacitor being capable of being charged from multiple power sources including radio frequency energy transmitted by an exciter.

11. The remote monitoring system of claim 10 wherein the microcontroller unit further comprises a central processing unit (CPU) and electronically alterable programmable read only memory (EEPROM) connected to the CPU, whereby fault data values are contained on the EEPROM and may be updated.

12. The remote monitoring system of claim 10 further comprising a radiological, biological, chemical and environmental (RBCE) sensor.

13. The remote monitoring system of claim 10 further a transformer for receiving energy from transmitted radio frequency (rf) energy, a diode for rectifying the rf energy from said transformer, whereby said transformer and diode can charge the super capacitor of the remote monitoring system.

14. A method for remotely monitoring an electric street light, the method comprising:
    a) providing at least one street light photocontroller and monitor integrally coupled to said street light, said street light photocontroller and monitor comprising a microcontroller, an antenna coupled to said microcontroller, and at least one sensor coupled to a microcontroller;
    b) obtaining input data on the present condition of the streetlight by way of the at least one sensor;
    c) transmitting the input data from said at least one sensor to said microcontroller;
    d) comparing said input data to a set of baseline data stored in non-volatile EEPROM memory in said microcontroller;
    e) generating a fault indicator warning condition if said input data is outside of said baseline data;
    f) transmitting an electronic signal containing said fault indicator warning through the antenna;
    g) holding all data in said non-volatile EEPROM memory during a power loss.

15. The method of remote monitoring of claim 14 wherein said fault indicator warning condition further comprises an LED.

16. The method of claim 14 further comprising the step of storing said input data and said fault indicator warning condition upon the generation of a fault indicator warning condition upon loss of power to a street light thereby transmitting said data and said indicator condition to non-volatile EEPROM memory.

17. The method of claim 14 wherein the said transmitting step further comprises transmitting said input data along with said fault indicator condition.

18. The method of claim 14 wherein the microcontroller further comprises a central processing unit (CPU) and electronically alterable programmable read only memory (EEPROM) connected to the CPU, whereby fault indicator data values are contained on the EEPROM.

19. The method of claim 14 further comprising the steps of storing the fault indicator warning data and sensor data within-non volatile memory; transmitting an external query for the fault indicator warning and sensor data to the microcontroller through the antenna; transmitting a reply signal containing the fault indicator and sensor data and receiving said fault indicator and sensor data.

20. A method of monitoring parametric data in a network of electric Street light controllers, the method comprising:
    a) providing at least one remote monitoring node including at least one programmable radio frequency identification (RFID) device wherein each streetlight controller contain an REID device;
    b) obtaining parametric data from said electric street light controller network;
    c) imputing said parametric data into the at least one monitoring node;
    d) storing said parametric data on the at least one programmable RFID device;
    e) querying said at least one programmable REID device for said parametric data.

21. The method of claim 20 further comprising the step of comparing said parametric data to a preset baseline data and generating a fault indicator status condition of said parametric data falls outside said preset baseline data, storing said fault indicator status condition on the at least one programmable RFID device and querying said at least one programmable REID device for said parametric data and fault status condition.

22. The method of claim 20 wherein the step of querying said parametric data and said fault status comprises transmitting said data and indicator status from said REID to an external receiver.

* * * * *

UNITED STATES PATENT AND TRADEMARK OFFICE
CERTIFICATE OF CORRECTION

| | |
|---|---|
| PATENT NO. | : 7,369,056 B2 |
| APPLICATION NO. | : 11/274993 |
| DATED | : May 6, 2008 |
| INVENTOR(S) | : Norman D. McCollough, Jr. |

It is certified that error appears in the above-identified patent and that said Letters Patent is hereby corrected as shown below:

Please correct Claims 10, 20, 21 and 22 as follows:

Claim 10, Column 5, line 31, please delete "en".

Claim 20, Column 6, line 44, please delete "REID" and insert -- RFID --.

Claim 20, Column 6, line 52, please delete "REID" and insert -- RFID --.

Claim 21, Column 6, line 60, please delete "REID" and insert -- RFID --.

Claim 22, Column 6, line 64, please delete "REID" and insert -- RFID --.

Signed and Sealed this

Twelfth Day of August, 2008

JON W. DUDAS
*Director of the United States Patent and Trademark Office*